(12) United States Patent
Joret et al.

(10) Patent No.: US 9,169,026 B2
(45) Date of Patent: Oct. 27, 2015

(54) TURBOJET ENGINE NACELLE

(75) Inventors: Jean Philippe Joret, Beuzeville (FR); Guy Bernard Vauchel, Harfleur (FR)

(73) Assignee: AIRCELLE, Gonfreville l'Orcher (FR)

( * ) Notice: Subject to any disclaimer, the term of this patent is extended or adjusted under 35 U.S.C. 154(b) by 659 days.

(21) Appl. No.: 13/129,254

(22) PCT Filed: Sep. 7, 2009

(86) PCT No.: PCT/FR2009/001067
§ 371 (c)(1),
(2), (4) Date: May 13, 2011

(87) PCT Pub. No.: WO2010/055217
PCT Pub. Date: May 20, 2010

(65) Prior Publication Data
US 2011/0220218 A1    Sep. 15, 2011

(30) Foreign Application Priority Data

Nov. 13, 2008  (FR) ...................................... 08 06317

(51) Int. Cl.
*B64D 29/08*    (2006.01)
*B64D 33/02*    (2006.01)

(52) U.S. Cl.
CPC ........ *B64D 29/08* (2013.01); *B64D 2033/0286* (2013.01); *Y10T 137/0536* (2015.04)

(58) Field of Classification Search
CPC ......... F01D 25/24; F01D 25/243; F02C 7/20; B64C 7/02; B64C 1/16; B64C 3/32; B64D 29/08; B64D 33/02; B64D 2033/0286
USPC .......... 415/126, 213.1, 214.1, 220; 244/53 R, 244/54, 53 B, 110 B
See application file for complete search history.

(56) References Cited

U.S. PATENT DOCUMENTS

| 4,044,973 | A | * | 8/1977 | Moorehead | ..................... 244/54 |
| 5,035,379 | A | * | 7/1991 | Hersen et al. | ............. 244/129.4 |
| 5,251,917 | A | * | 10/1993 | Chee et al. | .................... 277/645 |

(Continued)

FOREIGN PATENT DOCUMENTS

| FR | 2757823 A1 | 7/1998 |
| FR | 2898870 A1 | 9/2007 |

(Continued)

OTHER PUBLICATIONS

International Search Report PCT/FR2009/001067; Dated Nov. 24, 2009.

*Primary Examiner* — Edward Look
*Assistant Examiner* — Danielle M Christensen
(74) *Attorney, Agent, or Firm* — Brinks Gilson & Lione

(57) ABSTRACT

The invention relates to a nacelle (1) for a turbojet engine (8) comprising: an air intake structure (4) able to channel a flow of air towards a fan (7) of the turbojet engine (8), comprising an air intake lip (21) upstream of the nacelle (1) and attached at its ends to an outer panel (25) and an inner panel (23); a central structure (5) intended to surround said fan (7) and to which the air intake structure (4) is attached in such a way as to ensure aerodynamic continuity, said central structure (5) comprising a secondary, or bypass, flow path outer ring section (11) intended to surround the engine and a central outer cowl (13), and a downstream section (6), the outer panel (25) comprising a moving part (25*a*) attached to the air intake lip (21) and extending downstream of the inner panel (23) and at least one fixed part (25*b*) fixed to the central structure (5) or to the downstream section (6) and intended to nest together with the moving part (25*a*) through their having complementary shapes.

8 Claims, 4 Drawing Sheets

(56) References Cited

U.S. PATENT DOCUMENTS

| | | | |
|---|---|---|---|
| 5,609,313 A | 3/1997 | Cole et al. | |
| 6,328,258 B1* | 12/2001 | Porte | 244/53 B |
| 6,340,135 B1* | 1/2002 | Barton | 244/53 B |
| 6,360,989 B1* | 3/2002 | Maguire | 244/53 B |
| 2006/0038066 A1* | 2/2006 | Udall et al. | 244/54 |
| 2006/0237582 A1* | 10/2006 | Layland et al. | 244/53 R |
| 2010/0068051 A1* | 3/2010 | Cloft et al. | 415/220 |

FOREIGN PATENT DOCUMENTS

| | | |
|---|---|---|
| FR | 2906568 A1 | 4/2008 |
| FR | 2914363 A1 | 10/2008 |
| GB | 2274490 A | 7/1994 |
| WO | WO 2008000924 A1 * | 1/2008 |

\* cited by examiner

TURBOJET ENGINE NACELLE

TECHNICAL FIELD

The invention relates to a turbojet engine nacelle.

BACKGROUND

An aircraft is propelled by one or several propulsion assemblies comprising a turbojet engine housed in a tubular nacelle. Each propulsion assembly is attached to the aircraft by an attachment pylon generally situated under a wing or at the fuselage.

A nacelle generally has a structure comprising an air intake upstream of the engine, a central section intended to surround a fan of the turbojet engine, a downstream section housing thrust reverser means and intended to surround the combustion chamber of the turbojet engine.

"Downstream" here refers to the direction corresponding to the direction of the air flow, in particularly of cold air, penetrating the turbojet engine. "Upstream" designates the opposite direction.

The air intake comprises, on one hand, an air intake lip adapted to allow optimal collection towards the turbojet engine of the air necessary to supply the fan and the internal compressors of the turbojet engine, and on the other hand, a downstream structure on which the lip is attached and intended to channel the air suitably towards the vanes of the fan. The assembly is attached upstream of a fan case surrounding the fan belonging to the turbojet engine.

The nacelle houses internal equipment necessary for the operation of the turbojet engine. This internal equipment is housed on a large portion of the length of the nacelle. Thus, upstream of the nacelle, there are deicing systems to prevent frost or ice from forming on the air intake lip and thereby greatly decreasing the performance of the engine. Further downstream, some internal equipment allows the supply and proper operation of the engine.

Currently, maintenance operations on this internal equipment require the builders to provide access hatches. Despite the efforts made to optimize the positioning of the hatches and allow the easiest possible access, it is sometimes necessary to reach said equipment using specific tools, such as an endoscope, which is not fully satisfactory in terms of monitoring this equipment.

Moreover, in the event it is necessary to replace part of the internal equipment, it is generally necessary to take out the entire air intake structure, which requires significant tools and causes immobilization of the propulsion assembly and therefore of the aircraft in general.

It will also be noted that the conditions for exploitation and maintenance of an air intake require distinct components, such as a sectorized modular lip as well as an easily removable outer panel due to their high replacement rate as a result of their direct exposure to the outside environment and any projectiles. These constraints significantly reduce the integrity of the general aerodynamic line of the air intake structure, which the presence of access hatches further aggravates.

Solutions have been presented in document U.S. Pat. No. 5,609,313 and application FR 06/08599. In order to offset the mentioned drawbacks, these documents provide a turbojet engine nacelle comprising an air intake structure that can be translated forward and thereby at least partially exposes the area situated inside the nacelle.

In this way, by incorporating the air intake lip into the outer panel so as to form a single disassemblable piece, disassembly and at least partial replacement of the air intake structure are made easier. As a result, it is possible to access internal equipment without demanding substantial and complicated maneuvers or requiring a long immobilization time.

These mobile cowls are generally mounted on a rail/slide system made up of rails and slides arranged around the nacelle. The rails make it possible to release the assembly formed by the outer panel and the air intake lip to free the zone situated inside the air intake structure. Nevertheless, the internal equipment housed downstream of the air intake structure remains difficult to access.

Application GB 2 274 490 proposes a nacelle in which the outer panel and the air intake lip form a movable structure sliding in the upstream direction of the nacelle via a system of rails. Furthermore, the outer panel covers the inner panel and the fan casing to which the inner panel is attached.

Nevertheless, this type of nacelle can be difficult to manipulate. There is a significant risk of jamming, in particular between the attachment pylon and the outer panel. Furthermore, this type of nacelle is not suitable for nacelles arranged at the fuselage of an aircraft and for which the attachment pylon is substantially horizontal relative to the body of the aircraft. In that case, the thickness of the nacelle is thin with the result that the outer panel can abut against internal equipment present inside the nacelle.

BRIEF SUMMARY

One aim of the present invention is therefore to provide a turbojet engine nacelle that can be attached on a substantially horizontal attachment pylon and having good maneuverability to easily access the inside of the nacelle downstream of the inner panel.

To that end, the invention relates to a turbojet engine nacelle comprising:

an air intake structure able to channel a flow of air towards a fan of the turbojet engine, comprising an air intake lip upstream of the nacelle and attached at its ends to an outer panel and an inner panel;

a central structure intended to surround said fan and to which the air intake structure is attached in such a way as to ensure aerodynamic continuity, said central structure comprising a secondary, or bypass, flow path outer ring section intended to surround the engine and a central outer cowl, and a downstream section, characterized in that the outer panel comprises a moving part attached to the air intake lip and extending downstream of the inner panel and at least one fixed part fixed to the central structure or to the downstream section and intended to nest together with the moving part through their having complementary shapes.

The outer panel of the nacelle according to the invention comprises a moving part attached to the air intake lip and extending downstream of the inner panel and therefore over at least the zone where the fan is located. The outer panel according to the invention also comprises at least one fixed part fastened to the central structure and intended to nest with the moving part. Thus, when the moving part goes from a maintenance position in which said moving part attached to the air intake lip is moved away from the fixed part(s) and the central outer cowl to an operating position where the moving part and the fixed part are nested together to ensure the aerodynamic continuity of the outside of the nacelle, the fixed part(s) make it possible to guide the moving part so as to facilitate maneuverability while preventing any jamming with elements of the nacelle according to the invention, in particular the attachment pylon. The user can therefore easily access the equipment housed in the region extending downstream of the air intake structure.

Moreover, advantageously, it is possible to group together internal equipment located inside the nacelle under at least one fixed part. As a result, in the event the moving part goes from the operating position to the maintenance position, all risks of locking and percussion between said moving part and this internal equipment are prevented. In this way, the nacelle according to the invention is suitable for being installed on an attachment pylon that is substantially horizontal relative to the body of the aircraft.

According to other features of the invention, the assembly according to the invention includes one or more of the following optional features, considered alone or according to all possible combinations:

- the moving part extends over at least part of the outer shroud of the secondary flow channel, which makes it possible to obtain a more substantial undercut of the moving structure formed by the air intake lip and the moving part;
- the central outer cowl is maintained by reinforcing elements configured to fasten said central outer cowl to the secondary flow path outer ring section, which makes it possible to reinforce the structural strength of the central structure;
- the reinforcing elements are substantially S- or C-shaped elements, which makes it possible to easily attach these elements to the central structure and to the secondary flow path outer ring section;
- a fixed part is a ramp mounted around an attachment pylon of the nacelle, which makes it possible to avoid any jamming between the moving part and the attachment pylon during opening;
- the ramp has a substantially triangular shape extending along the longitudinal axis of the attachment pylon whereof the angle at the apex is at least equal to 5°, which ensures mobility of the outer panel without jamming thereof at the attachment pylon.
- a fixed part extends in the upstream direction of the nacelle according to the invention along the longitudinal axis thereof;
- the nacelle according to the invention is a nacelle for an aircraft fuselage, in particular intended to be fastened to a substantially horizontal attachment pylon.

BRIEF DESCRIPTION OF THE DRAWINGS

The invention will be better understood upon reading the following non-limiting description, done in reference to the appended figures.

DETAILED DESCRIPTION

Figure 1:
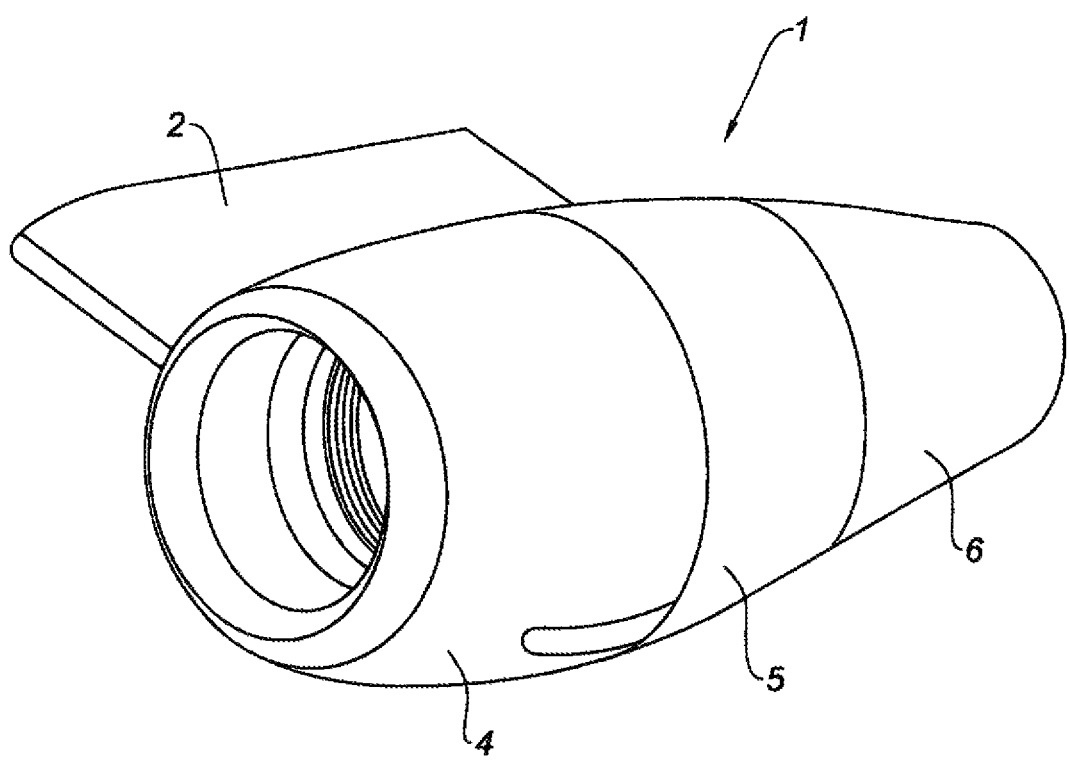
FIG. 1 is a perspective view of one embodiment of the nacelle 1 according to the invention.

According to the embodiment shown in FIG. 1, the nacelle 1 according to the invention is intended to be attached via an attachment pylon 2 to a fixed structure of an aircraft, such as a wing. In this embodiment, the nacelle 1 according to the invention is arranged at the fuselage of the aircraft via a substantially horizontal attachment pylon relative to the body of the aircraft. The nacelle 1 according to the invention can also apply to any type of nacelle known by those skilled in the art.

More precisely, the nacelle 1 according to the invention shown in FIG. 1 has a structure comprising an air intake structure 4 upstream, a central structure 5 surrounding a fan 7 of the turbojet engine 8 as well as a part thereof, and a downstream section 6 surrounding the downstream part of the turbojet engine 8 and generally housing a thrust reverser system (not shown).

The fan 7 of the turbojet engine is surrounded by an engine casing 9 intended to be fixed by its upstream end to the air intake structure 4 and by its downstream end to the central structure 5 so as to ensure aerodynamic continuity.

Figure 2:
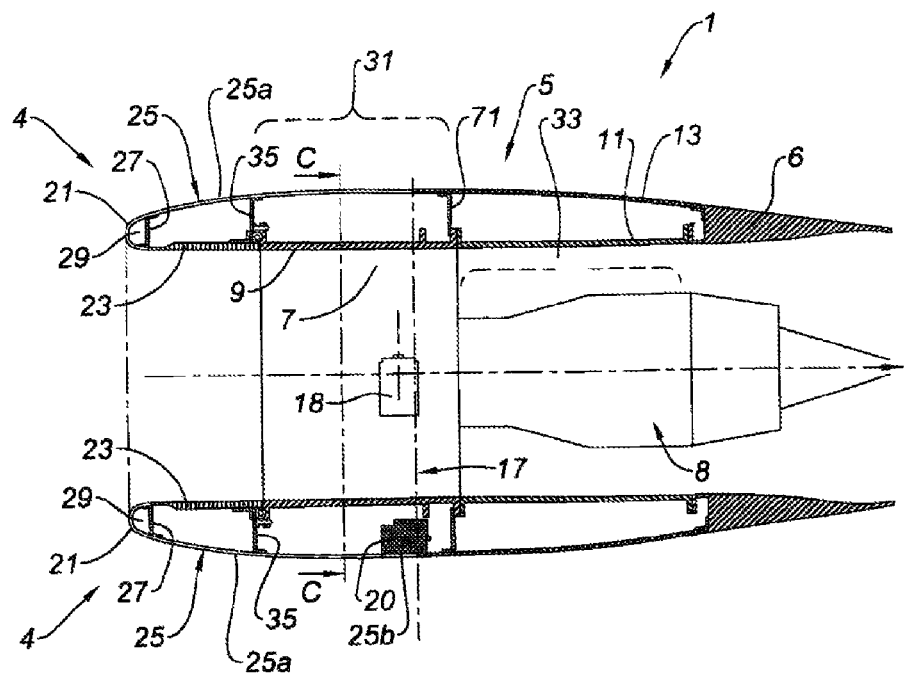
FIGS. 2 and 3 are partial transverse cross-sectional views of the embodiment of FIG. 1 in the open and closed positions, respectively.
Figure 3:
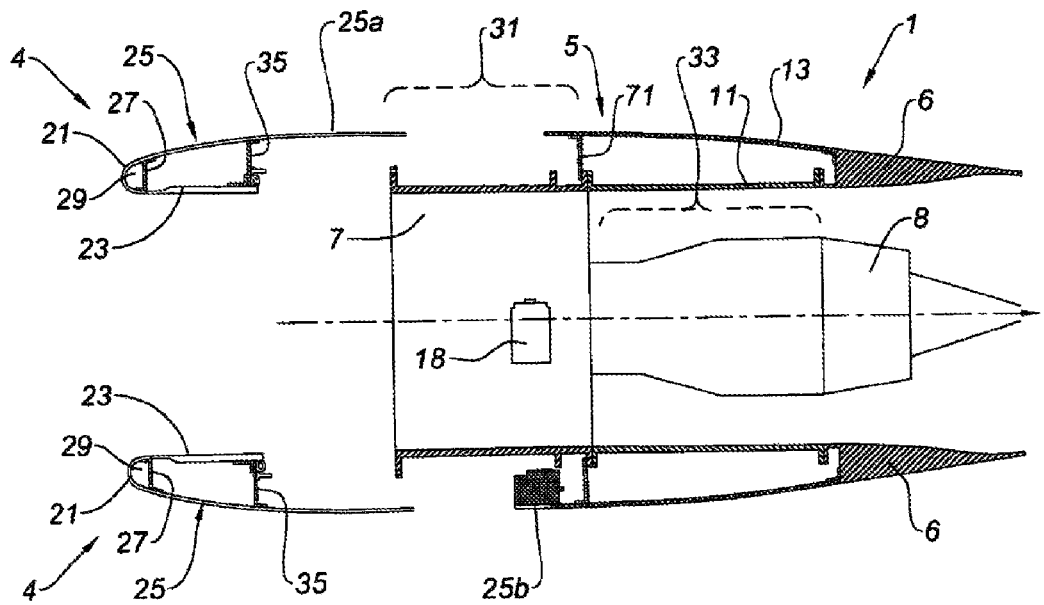

As shown in FIG. 2, the central structure 5 also includes a secondary flow path outer ring section 11 attached at one end to the fan casing 9 so as to surround part of the turbojet engine 8, and at another end to the downstream section 6. The attachment of said secondary flow path outer ring section 11 is done using any means known by those skilled in the art.

According to the embodiment shown in FIG. 1, the flow of air traverses the blades of the fan to emerge in a conduit delimited by the turbojet engine 8, the secondary flow path outer ring section 11 and the downstream section 6.

The central structure 5 can also include a central outer cowl 13 intended to surround the fan case 9 and/or the secondary flow path outer ring section 11.

The air intake structure 4 includes an air intake lip 21 connected at a first end to an inner panel 23.

The air intake lip 21 is adapted to allow optimal collection towards the turbojet engine 8 of the air needed to supply the fan 7 and internal compressors of the turbojet engine 8. Typically, the air intake lip 21 is made from aluminum, titanium, or any composite material, in particular high temperature, known by those skilled in the art and suitable for a pneumatic deicing application.

The inner panel 23 is intended to suitably channel the air towards the vanes (not shown) of the fan 7. The inner panel 23 is thus fastened at its downstream end to an upstream end of the fan casing 9 via fastening means. Thus, the inner panel 23 forms, with the central structure 5 and the fan casing 9, a fixed structure relative to the nacelle 1. Typically, the inner panel 23 is made from a composite material with carbon, or aluminum. The inner panel 23 can be made in a single piece or several assembled pieces.

Furthermore, the inner panel 23 can comprise an acoustic shroud intended to attenuate the noise annoyance due to the operation of the turbojet engine 8 and the vibrations of the nacelle 1 according to the invention. The acoustic shroud is typically made up of a honeycomb structure or any other structure known by those skilled in the art making it possible to absorb the acoustic vibrations.

A partition 27 separates the air intake lip 21 from the rest of said air intake structure 4. The partition 27 thus makes it possible to delimit a cavity 29 within which the equipment, such as deicing equipment, is arranged to ensure the operation of the nacelle 1 according to the invention. Typically, the partition 27 is made from aluminum, titanium, or any composite material, known by those skilled in the art. The nacelle 1 according to the invention also includes an outer panel 25 comprising a moving part 25a and at least one fixed part 25b. The moving part 25a is attached to a second end of the air intake lip 21 using any means known by those skilled in the art.

The mobile part 25a substantially covers the inner panel 23 and extends downstream in the area where the fan 7 and the fan casing 9 are situated, so as to form a single disassemblable piece, called moving structure. To that end, the air intake lip 21 can be incorporated into said moving part 25a.

The fixed part(s) 25b are fastened to the central structure 5, in particular the outer cowl 13, or to the downstream section 6 using any means known by those skilled in the art. The fixed part(s) 25b are intended to nest together with the moving part 25a through having complementary shapes. To that end, the fixed part(s) 25b have a complementary shape appropriate for the corresponding opening present on the mobile part 25a. Thus, the aerodynamic continuity of the outer panel is ensured when the moving part is in the closed position.

Moreover, advantageously, the fixed part(s) 25b serve as guide means when the moving part 25a goes from the maintenance position to the closed position. To that end, sealing means such as joints can be provided between the fixed part(s) 25b and the moving part 25a.

Typically, the moving part 25a and the fixed part(s) 25b of the outer panel 25 are made from a composite material with carbon, or from aluminum. The moving part 25a and the fixed part(s) 25b can be made in a single piece or several assembled pieces.

The mobility of the air intake lip 21 and the moving part 25a thus allows a release downstream of the intake structure to more easily access the internal equipment of the nacelle 1 according to the invention located in the area 31 situated downstream of the air intake structure 4. The maneuverability of the moving structure is made easier by the presence of the at least one fixed part, which makes it possible to guide the closing of this moving structure.

As indicated in FIG. 2, the line 17 delimits the undercut downstream of the air intake structure 4. This undercut is conditioned in particular by the aerodynamic profile of the nacelle 1 according to the invention. Indeed, in the context of nacelles arranged at the fuselage by substantially horizontal attachment pylons, the length of the outer panel 25 is limited by the bulk of the internal equipment 20. If a piece of internal equipment 20 is too bulky, then the end downstream part of the moving part 25a can abut against that equipment 20, which locks and risks damaging the outer panel 25 and the internal equipment 20. The delimitation shown by the line 17 is also conditioned by the need to access certain equipment, such as the oil tank, in particular the stopper 18.

Examples of internal equipment 20 also include electrical and electronic equipment.

In order to support the larger surface area of the outer panel 25, in particular the surface of the moving part 25a and of the fixed part 25b, reinforcing members 35 are fastened on the outer panel 25 and on the inner panel 23. This type of reinforcing member 35 can be any type of reinforcing member known by those skilled in the art. Thus, the reinforcing members 35 can be made from an organic or metal material and/or substantially C- or S-shaped. The reinforcing members 35 can also be continuous or local.

Figure 4:
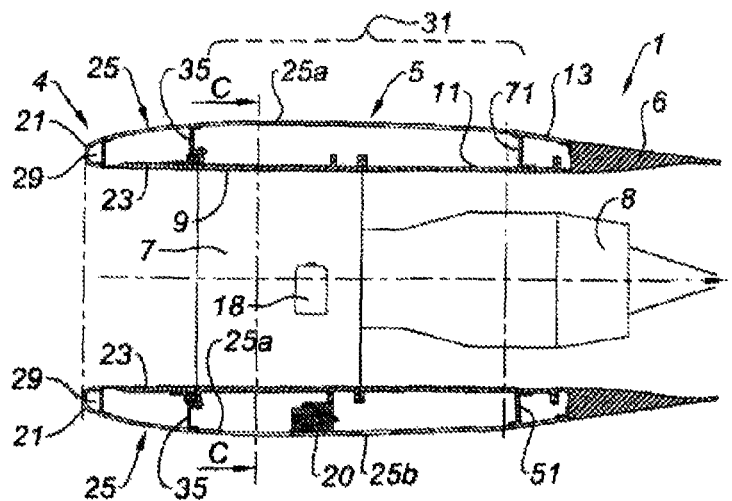
FIGS. 4 and 5 are partial transverse cross-sections of an alternative of the embodiment of FIG. 1 in the open and closed position, respectively.
Figure 5:
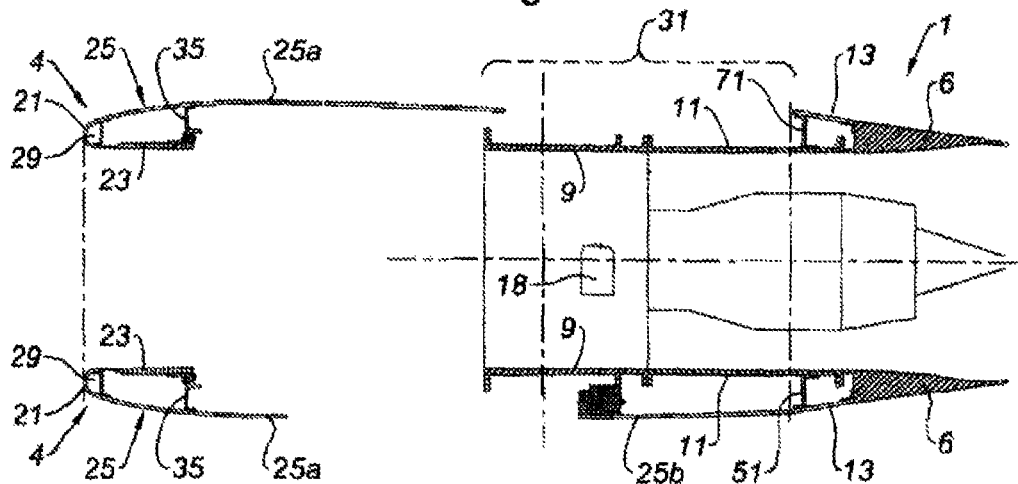

Internal equipment 20 can be grouped together in particular at 3:00, 6:00, or 12:00 of the attachment pylon 2, under the at least one fixed part 25b and thus it is possible to extend the length of the moving part 25a (see FIGS. 4 and 5). The orientations 3:00, 6:00 and 12:00 correspond to positions in a transverse section of the nacelle 1 according to the invention relative to the attachment pylon 2.

Examples of equipment that can be grouped together include the accessory gear box and the oil tank.

Some fragile equipment, such as electronic equipment, can be damaged when it undergoes high temperatures, in particular above 110° C. With this in mind, this type of equipment can advantageously be positioned at 3:00 of the attachment pylon and thereby avoid the sun's rays. Examples of such equipment include the electric and electronic switching unit of the nacelle 1 according to the invention.

According to the embodiment shown in FIGS. 4 and 5, the moving part 25a extends over at least part of the outer shroud of the secondary flow channel 11, which makes it possible to obtain an undercut even further downstream and thus allows access to internal equipment housed in the region 33 close to the downstream section 6. In that case, the length of the central outer cowl 13 is shortened.

In an alternative that is not shown, the moving part 25a can extend over the entire zone including the fan 7 and the fan casing 9 and over the outer shroud of the secondary flow channel 11. Thus, in this embodiment, the central outer cowl 13 is eliminated and the fixed part(s) 25b are fastened to the downstream section 6. As a result, the moving part 25a and the at least one fixed part 25b perform the function of the central outer cowl 13.

The fixed part(s) 25b can be made up of one element or of several elements arranged on the circumference and attached to the central outer cowl 13 or the downstream section 6. The number of such elements can depend on the arrangement of the internal equipment 20.

At least one fixed part 25b in particular has a surface with a shape and size suitable for covering internal equipment 20 and thereby preventing any damage of the moving part 25a. Thus, the at least one fixed part 25b can have an elongated shape in the upstream direction of the nacelle 1 according to the invention. The shape and dimensions of said fixed part 25b can be chosen as a function of other criteria, such as the maneuverability of the moving part 25a.

Figure 6:
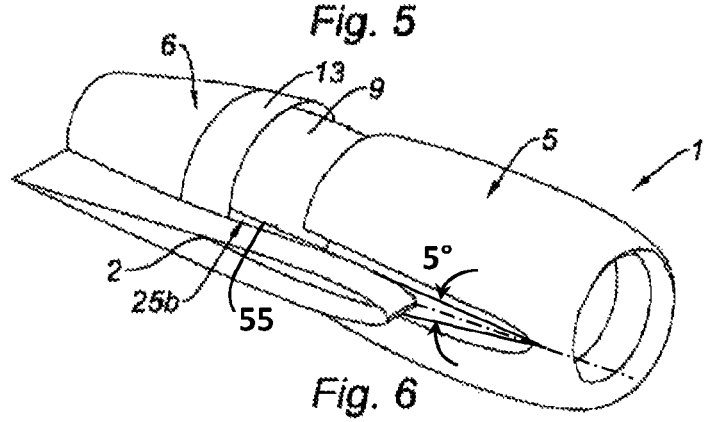
FIGS. 6 and 7 are a perspective view and a transverse view of another embodiment of FIG. 1.
Figure 7:
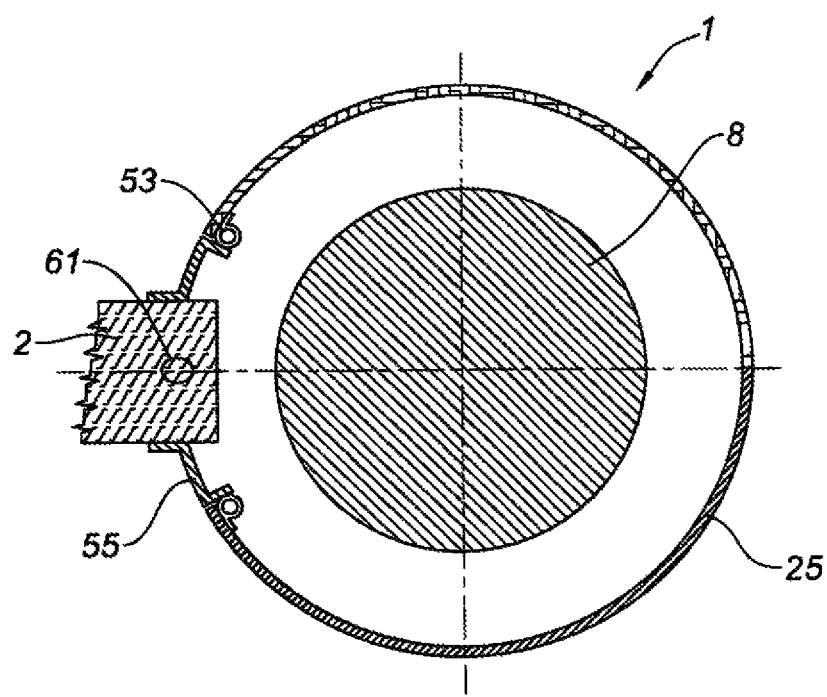

According to the embodiment shown in FIGS. 6 and 7, a fixed part 25b comprises a ramp 55 mounted around the attachment pylon 2 of the nacelle according to the invention and connected using a sealing means 53 to the moving part 25a. In this way, any jamming between the moving part 25a and the attachment pylon 2 during opening is prevented. The sealing means is of any type known by those skilled in the art, for example a joint. The ramp 55 can have any suitable shape known by those skilled in the art, in particular a substantially triangular shape extending along the longitudinal axis 61 of the attachment pylon 2 whereof the angle at the apex is between 2° and 10°, preferably at least equal to 5°, which ensures mobility of the moving part 25a without jamming thereof at the attachment pylon 2. Furthermore, this makes it possible to avoid crushing the sealing means 53, in particular pressure seals. The presence of crushing causes a significant increase in forces when the nacelle 1 according to the invention is manipulated.

The ramp 55 can also have a shape adapted to cover internal equipment.

The central outer cowl 13 is maintained by reinforcing elements 71 configured to fasten said central outer cowl 13 to the secondary flow path outer ring section 11 (see FIGS. 2 to 5). Thus, the structural strength of the central structure 5 is reinforced. The reinforcing elements 71 can be substantially S- or C-shaped elements, which makes it possible to easily attach these elements 71 to the central structure 5 and to the secondary flow path outer ring section 11. Said elements 71 can be made from an organic or metal material.

In order to allow the mobile structure to retract upstream of the nacelle 1, the latter is typically provided with guide means (not shown) able to allow a substantially rectilinear movement of the outer panel 25 in the upstream direction of the nacelle 1 so as to be able to open the air intake structure 4 for maintenance issues. Examples of rail systems include the rail systems described in application FR 2 906 568, such as slides on rails, a rail in a crease able to cooperate with a slide system, a system of rolling skates capable of cooperating with a corresponding rail, as well as a longitudinal axis capable of sliding through a corresponding opening.

The invention claimed is:

1. A turbojet engine nacelle comprising:
   an air intake structure to channel a flow of air towards a fan of the turbojet engine, comprising an air intake lip upstream of the nacelle and attached at its ends to an outer panel and an inner panel;
   a central structure to surround said fan and to which the air intake structure is attached in such a way as to provide aerodynamic continuity, said central structure comprising a secondary, or bypass, flow path outer ring section surrounding the turbojet engine and a central outer cowl; and
   a downstream section to which the central structure is attached,
   wherein the outer panel comprises a moving part attached to the air intake lip and extending downstream, and guide means configured to guide the moving part and forming an outer contour of the outer panel, the guide means comprising at least one fixed part fixed to the central structure or to the downstream section, said at least one fixed part having a complementary shape to nest together with and to guide the moving part along longitudinal side edges of the at least one fixed part,
   wherein the at least one fixed part comprises a ramp mounted around an attachment pylon of the nacelle, and the ramp is connected to the moving part by sealing means, the sealing means being placed along the longitudinal side edges of the at least one fixed part where the moving part comes into contact with the at least one fixed part.

2. The nacelle according to claim 1, wherein the moving part extends over at least part of an outer shroud of the secondary flow path outer ring section.

3. The nacelle according to claim 1, wherein the central outer cowl is maintained by reinforcing elements configured to fasten said central outer cowl to the secondary flow path outer ring section.

4. The nacelle according to claim 3, wherein the reinforcing elements are substantially S- or C-shaped elements.

5. The nacelle according to claim 1, wherein the ramp has a substantially triangular shape extending along a longitudinal axis of the attachment pylon whereof an angle at an apex is at least equal to 5°.

6. The nacelle according to claim 1, wherein the fixed part extends in the upstream direction of the nacelle along a longitudinal axis thereof.

7. The nacelle according to claim 1, wherein the nacelle is a nacelle for an aircraft fuselage.

8. The nacelle according to claim 1, wherein the nacelle is fixed to a substantially horizontal attachment pylon.

* * * * *